US007010988B2

(12) United States Patent
Backlund et al.

(10) Patent No.: US 7,010,988 B2
(45) Date of Patent: Mar. 14, 2006

(54) METHOD AND A DEVICE FOR MEASURING STRESS FORCES IN REFINERS

(75) Inventors: Hans-Olof Backlund, Sundsvall (SE); Per Gradin, Stöde (SE)

(73) Assignee: Metso Paper, Inc., (FI)

( * ) Notice: Subject to any disclaimer, the term of this patent is extended or adjusted under 35 U.S.C. 154(b) by 151 days.

(21) Appl. No.: 10/487,118

(22) PCT Filed: Aug. 22, 2002

(86) PCT No.: PCT/SE02/01501

§ 371 (c)(1),
(2), (4) Date: Feb. 19, 2004

(87) PCT Pub. No.: WO03/018200

PCT Pub. Date: Mar. 6, 2003

(65) Prior Publication Data

US 2004/0199338 A1 Oct. 7, 2004

(30) Foreign Application Priority Data

Aug. 27, 2001 (SE) .................................... 0102845

(51) Int. Cl.
*G01N 3/08* (2006.01)

(52) U.S. Cl. ........................................................ 73/829

(58) Field of Classification Search .................. 73/826, 73/829
See application file for complete search history.

(56) References Cited

U.S. PATENT DOCUMENTS 6,915,711 B1 * 7/2005 Backlund et al. ...... 73/862.391
2001/0032898 A1 * 10/2001 Bankes et al. ................ 241/30
2004/0144875 A1 * 7/2004 Johansson ................ 241/261.1

FOREIGN PATENT DOCUMENTS

SE 7601019-8 A1 4/1979
WO WO-00/78458 A1 12/2000

* cited by examiner

*Primary Examiner*—Max Noori
(74) *Attorney, Agent, or Firm*—Lerner, David, Littenberg, Krumholz & Mentlik, LLP

(57) ABSTRACT

Methods of measuring stress forces in refiners are disclosed in which the refiners include refining disks with a refining surface and refining bars extending across the refining surface, as well as a measuring surface comprising a portion of the refining surface, the measuring surface being movably mounted on the surface of at least one of the refining disks and a pair of rigidly mounted force sensors for producing oppositely directed deflections when the measuring surface is influenced by stress forces, the method comprising resiliently mounting the measuring surface in a direction parallel to the surface of the refining disk and calculating the stress force based on the difference between the deflections measured by the respective pairs of the force sensors. Apparatus measuring stress forces in such refiners are also disclosed.

9 Claims, 2 Drawing Sheets

METHOD AND A DEVICE FOR MEASURING STRESS FORCES IN REFINERS

FIELD OF THE INVENTION

The present invention relates to a method and apparatus for measuring stress forces in refiners having refining disks that define a refining gap between them for refining material.

BACKGROUND OF THE INVENTION

Refiners such as those discussed above are used for refining fibrous material. These refiners normally comprise refining members in the form of disks which rotate in relation to each other and between which refining material passes from the inner periphery of the refining members, where the refining material is supplied, to the outer periphery of the refining members, through a refining gap formed between the refining members. Often one of the refining disks is stationary while the other one rotates. The refining disks are generally constructed from refining segments provided with bars. The inner segments generally have a coarse pattern and the outer segments generally have a finer pattern in order to achieve fine refining of the refining material.

To ensure good quality refining material when refining fibrous material, the disturbances in operating conditions that continually occur for various reasons are corrected by continuous control of the various refining parameters to optimal values. This can be achieved, for instance, by altering the supply of water to give greater or less cooling effect, by changing the flow of refining material, or by adjusting the distance between the refining members, or a combination of these measures. To enable the necessary adjustments and corrections careful determination of the energy transmitted to the refining material is necessary, as well as the distribution of the energy transmitted across the surface of the refining members.

In order to determine the energy/power transmitted to the refining material it is known to attempt to measure the shearing forces occurring in the refining zone. It is known that a shearing force occurs when two surfaces move in relation to each other with a viscous liquid between them. Such a shearing force is also created in a refiner when refining wood chips are mixed with water. It can be imagined that the wood chips are both sheared and rolled between the refining disks, and also that collisions occur between wood chips and bars. The shearing force is dependent, inter alia, on the force of the disks as they are brought together as well as the friction coefficient. Furthermore, the normal force exerted on the surface varies with the radius.

A method and a measuring device are known for measuring stress forces in such refiners, as shown in International Application No. WO 00/78458, comprising a force sensor that measures the stress forces over a measuring surface constituting a part of a refining disk, and where the measuring surface comprises at least parts of more than one bar and is resiliently arranged in the surface of the refining disk. However, this measuring device has proved to be very sensitive to temperature variations, which are common in the relevant conditions, and it therefore often gives incorrect values for the stress, which cannot be used to control the refining process.

One object of the present invention is to solve the problems mentioned above and to thus provide a method and a measuring device that provides a more reliable result than known devices.

SUMMARY OF THE INVENTION

In accordance with the present invention, this and other objects have now been realized by the discovery a method of measuring stress forces in refiners including a pair of relatively rotatably refining disks juxtaposed with a refining gap therebetween for refining material within the refining gap, each of the pair of refining disks including a refining surface and a plurality of refining bars extending across the refining surface, and a measuring surface comprising a predetermined portion of the refining surface of at least one of the refining disks including at least a portion of a plurality of the refining bars, the measuring surface being movably mounted on the surface of the at least one refining disk, and a pair of rigidly mounted force sensors for producing oppositely directed deflections when the measuring surface is influenced by stress forces, the method comprising resiliently mounting the measuring surface in a direction parallel to the surface of the at least one refining disk and calculating the stress force based on the difference between the deflections measured by the respective pairs of the force sensors. Preferably, the method includes calculating the magnitude and distribution of power transmitted to the refining material based on the difference between the deflections measured by the respective pairs of the force sensors and controlling the refining process using the calculated values.

In accordance with the present invention, this and other objects have now also been realized by the invention of apparatus for measuring stress forces in a refiner including a pair of relatively rotatable refining disks juxtaposed with a refining gap therebetween for refining material within the refining gap, each of the pair of refining disks including a refining surface including a plurality of refining bars extending across the refining surface, the apparatus comprising a measuring surface comprising a predetermined portion of the surface of at least one of the refining disks and including at least a portion of a plurality of the refining bars, the measuring surface being resiliently mounted on the surface of the at least one of the refining disks, a pair of force sensors producing oppositely directed deflections when the measuring surface is influenced by the stress forces, and a body connecting the pair of force sensors to the measuring surface, whereby the stress forces can be calculated based on the difference between the deflections measured for the pair of forced sensors. Preferably, the measuring surface includes a central axis substantially perpendicular to the measuring surface and wherein the pair of force sensors are symmetrically disposed with respect to the central axis.

In accordance with one embodiment of the apparatus of the present invention, each of the pair of force sensors abuts the body, and the apparatus includes attachment means for affixing the pair of force sensors with respect to the body. In a preferred embodiment, the body includes an extending portion disposed distal from the measuring surface, the extending portion of the body including a joint whereby the body is pivotable about the joint in a direction substantially parallel to the surface of the at least one of the refining disks.

In accordance with another embodiment of the apparatus of the present invention, the apparatus includes a seal member surrounding the measuring surface, the seal member comprising a yieldable material. In a preferred embodiment, the body includes a first end connected to the measuring surface and a second opposite end, the apparatus further comprising a housing containing the pair of force sensors and the body, and attachment means for attaching the pair of force sensors to the housing, the second opposite end of the body affixed in the housing, and the measuring surface and the seal member sealing the housing. Preferably, the apparatus includes a sleeve, with the sealing member being disposed in the sleeve, whereby the sealing member and the measuring surface close the housing.

In accordance with the method of the present invention, the measurement takes place by the measuring surface being resiliently mounted in a direction parallel to the surface of the refining disk and, in the event of a stress force, being movable in that direction in relation to two rigidly mounted force sensors with which the measuring surface is connected and which are arranged to produce oppositely directed deflection when the measuring surface is influenced by those stress forces, and the stress forces are calculated on the basis of the difference between the deflections measured for respective force sensors on each occasion. Using two force sensors offers the important advantage that a value can be obtained for the stress forces that is not affected by any temperature variations which occur. This is done by utilizing the difference between the deflections measured for respective force sensors on each occasion as a value of the stress forces. This value can then be used to calculate the magnitude and distribution of the power transmitted to the refining material and these calculations can then be utilized to control the refining process.

The use of two sensors, in the manner described in accordance with the present invention, renders the advantage that any error in measurement is halved.

A preferred embodiment of the measuring device in accordance with the present invention is one in which the device comprises members that measure the stress forces in the form of two force sensors arranged to produce oppositely directed deflection when the measuring surface is influenced by such stress forces, so that the stress forces can be calculated on the basis of the difference between the deflections measured for respective force sensors on each occasion, and it also comprises a body connecting the force sensors to the measuring surface. The advantages of using two force sensors have been described above and are of great significance in this context.

In accordance with an advantageous embodiment of the present invention the force sensors are arranged symmetrically, i.e. symmetrically in relation to a central axis of the measuring surface that is perpendicular to the measuring surface.

The sensors, which are preferably piezoelectric force sensors (also known as transducers), constructed out of quartz crystal (so-called quartz sensors), also contribute to an extremely rigid measuring device being possible. The preferred sensors can handle up to 200° C. and are also linear up to this temperature.

BRIEF DESCRIPTION OF THE DRAWINGS

The present invention will now be described with reference to the following detailed description which refers to the accompanying schematic drawings, in which.

DETAILED DESCRIPTION

Figure 1:
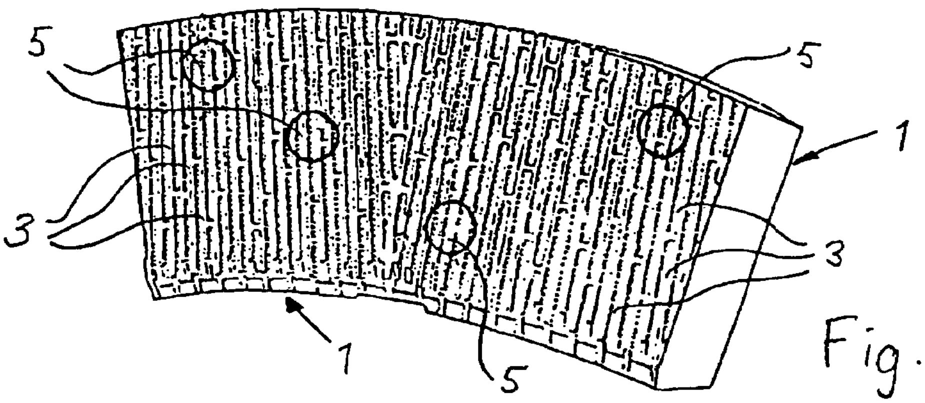
FIG. 1 is a top perspective view of a refining segment in a refining disk provided with measuring devices in accordance with the present invention.

FIG. 1 shows a part of a refining disks in the form of a refining segment 1 provided with a pattern comprising a number of bars 3 extending primarily in the radial direction. In this figure measuring devices 5 in accordance with the present invention have been schematically indicated. These measuring devices preferably have a circular measuring surface with a diameter in the order of 30 mm, for instance, but the measuring surface may also have some other geometric shape.

The measuring devices are preferably arranged at different radial distances from the center of the refining disk, and segments at different distances from the center preferably also have measuring devices. The measuring devices may also advantageously be peripherally displaced in relation to each other, these measures being aimed at being able to better determine the power distribution in the refiner and thus to better control the refining process. When a measuring device is influenced by a force parallel to the surface of the refining disk/segment, each force sensor of the measuring device will generate a signal that is proportional to the load.

Figure 2:
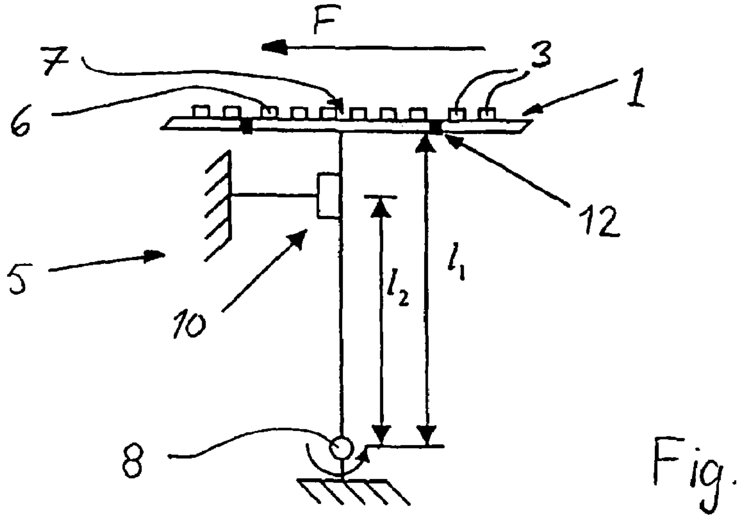
FIG. 2 is a side elevational, diagrammatic representation of a measuring device in accordance with the present invention.

The measuring device in accordance with the present invention functions in accordance with the principle illustrated in FIG. 2. This shows a disk segment 1 from the side, provided with bars 3. A measuring device 5 is also shown which, for the sake of simplicity, is shown as comprising only one force sensor 10, and a measuring surface 7 in the form of a portion of the surface of the disk segment, which is provided with a number of bars 6, or at least parts thereof. When the refining disk is subjected to a shearing load F the measuring device 5 (the sensor) will take up a load $F_m$ which is represented by the following expression:

$$F_m = F \cdot \frac{l_1}{l_2} \tag{1}$$

where $l_2$ is the distance between the location where the sensor 10 is attached in the measuring device and a joint 8 in the device, and where $l_1$ is the distance between the measuring surface 7 of the measuring device and the joint 8. This formula is valid provided the joint 8 does not take up any torque and that the pressure distribution over the measuring surface 7 subjected to the shearing force is not too uneven. In principle the joint 8 consists of a plate that is so thin that it contributes negligibly to the total rigidity of the measuring device while at the same time being able to withstand the loads it is subjected to. The thickness of the plate may be relatively great since the rigidity of the sensor is relatively great, thus resulting in only slight deflection of the plate. The dimensions of the joint 8 shall thus be suitable for withstanding the vertical load arising while at the same time absorbing only a negligible part of the lateral load that the screw and the sensor shall absorb. See also the detailed description with reference to FIG. 4.

Figure 3A:
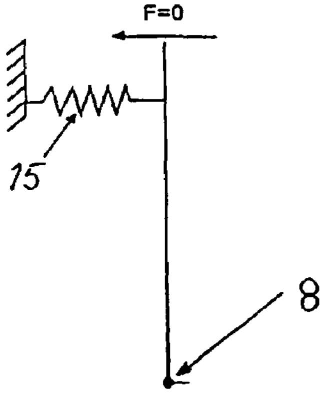
FIG. 3*a* is a diagrammatic representation of the force ratios applicable to the present invention.
Figure 3B:
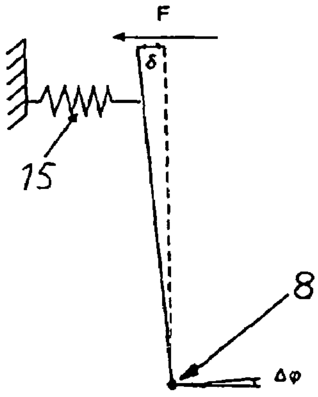
FIG. 3*b* is another diagrammatic representation of the force ratios applicable to the present invention.
Figure 4:
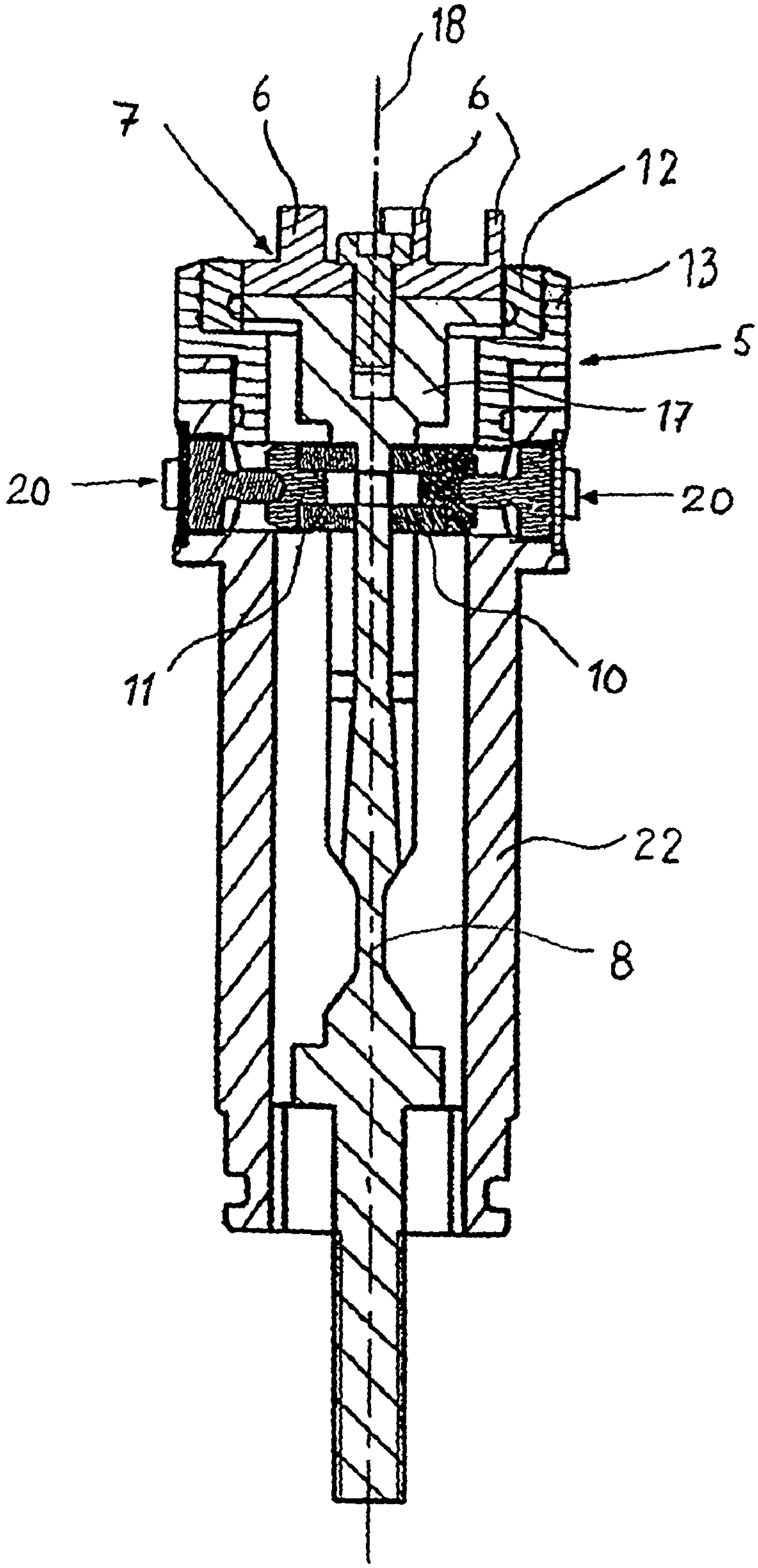
FIG. 4 is a side, elevational, sectional view of a measuring device in accordance with the present invention.

The models in FIGS. 3*a* and 3*b* depict how high or low rigidity affects the function of the measuring device through the rigidity of the sensor, the attachment screw (the attachment member by which each sensor is secured in relation to the measuring surface and the body, see FIG. 4) and joint. The force and the torque absorbed by the sensor/attachment screw and joint, respectively, are controlled by the equation $F_{sensor}=k_2 \cdot \delta$ and $M=k_3 \cdot \Delta\phi$, where M is the torque in the joint. $k_2$ is the rigidity of the spring 15, i.e. the sensor 10 together with the attachment screw 20, and the rigidity $k_3$ is the rigidity of the support point/joint 8. The equation shows clearly that if F is constant and $k_2$ increases then δ will decrease, as will also M since the torque is directly proportional to the deflection δ for small angles. In the present case $k_2$ is large, which means that equation (1) is valid.

It should be emphasized that by relatively high rigidity of the sensor/attachment screw is meant in the present case high rigidity in relation to the load the sensor/screw shall absorb. The load may vary considerably over the refining zone—from some 20N to some 150N, for instance. With an estimated average value of about 40N displacements of the measuring surface obtained in the present case can be measured in the order of hundredths of a millimeter. As mentioned earlier, these small displacements facilitate sealing of the device from the surrounding environment, for instance. As regards the body 17, this can be deemed completely rigid in a direction perpendicular to the measuring surface.

FIG. 4 shows a preferred embodiment of a measuring device in accordance with the present invention. The measuring device 5 comprises a measuring surface 7 provided with bars 6, or parts of bars, which measuring surface constitutes a part of a disk segment, as illustrated in FIG. 1. As can also be seen in FIG. 1, the measuring device preferably has a circular measuring surface.

The measuring surface 7 is in direct contact with a body 17, preferably of steel, which extends through the interior of the device. The measuring surface is preferably firmly screwed in the body 17. A short distance below the measuring surface the body 17 is provided with a transverse recess in which two force sensors, 10 and 11, are arranged, preferably quartz sensors. The sensors, 10 and 11, are fixed in relation to the body 17 by means of attachment screws 20 arranged to clamp each sensor against the body 17 on diametrically opposite sides thereof, as will be further described below. The attachment screws and any intermediate elements are preferably shaped so that a uniformly distributed load is obtained on each sensor, and preferably with a certain pre-stress. In accordance with this embodiment the sensors are arranged symmetrically in relation to a center line extending through the measuring surface 7 and the body 17. The sensors will thus produce oppositely directed deflection when influenced by a force. When the pressure on the measuring surface increases, therefore, the load will increase on one of the sensors and will simultaneously decrease on the other. Naturally it would be possible to arrange the sensors in some other way in relation to each other and still have their deflection oppositely directed. Other attachment devices for the sensors, 10 and 11, are naturally also possible.

The body 17 preferably has a circular cross section. Further down, below the sensors the body 17 assumes a narrowing, flattened shape within a surface corresponding to the joint 8, mentioned previously and described with reference to FIGS. 2, 3*a* and 3*b*.

The load $F_m$ which the measuring device will take up through the sensors, 10 and 11, when it is subjected to a shearing force F is calculated in this case as:

$$F_m = \frac{S_2 - S_1}{2} \cdot k \tag{2}$$

where $S_1$ is the shearing force indicated by the first sensor 10, $S_2$ is the shearing force indicated by the second sensor 11 and k is a scale factor based on previous calibrations.

This means that the shearing load F influencing the refining disk can be calculated as:

$$F = \frac{l_2}{l_1} \cdot \frac{S_2 - S_1}{2} \cdot k \tag{3}$$

This is the equation used to calculate the magnitude and distribution of the power transmitted to the refining material, these calculations then being utilized to control the refining process.

The sensors, 10 and 11, and the body 17 are arranged in a protective housing 22. This housing has an opening at the top abutting the surrounding refining segment, which is closed by the measuring surface 7, a seal 12 surrounding the measuring surface, and by a sleeve 13 in which the seal is arranged. The seal 12 consists of a particularly suitable, somewhat yielding material such as rubber, so that it can permit the small movements caused by the shearing forces in the measuring surface while still achieving a good seal that prevents steam and pulp from penetrating into the device. The seal preferably also has a damping effect on the vibrations that arise during operation. The purpose of the sleeve 13 is primarily to facilitate closing of the measuring device since the measuring surface and the seal are first mounted in the sleeve which can then easily be partially inserted into the housing 22. It is possible to omit the sleeve.

The housing 22 also has a function when it comes to fixing the sensors, 10 and 11, in relation to the measuring surface 7. The sensors are thus attached in the housing by means of attachment screws 20. Finally, the body 17 is attached in the housing at the end opposite to the measuring surface. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of measuring stress forces in refiners including a pair of relatively rotatable refining disks juxtaposed with a refining gap therebetween for refining material within said refining gap, each of said pair of refining disks including a refining surface and a plurality of refining bars extending across said refining surface, and a measuring surface comprising a predetermined portion of said refining surface of at least one of said refining disks including at least a portion of a plurality of said refining bars, said measuring surface being movably mounted on said surface of said at least one refining disk, and a pair of rigidly mounted force sensors for producing oppositely directed deflections when said measuring surface is influenced by stress forces, said method comprising resiliently mounting said measuring surface in a direction parallel to said surface of said at least one refining disk and calculating said stress force based on the difference between the deflections measured by said respective pairs of said force sensors.

2. The method of claim 1 including calculating the magnitude and distribution of power transmitted to said refining material based on the difference between the deflections measured by said respective pairs of said force sensors and controlling said refining process using said calculated values.

3. Apparatus for measuring stress forces in a refiner including a pair of relatively rotatable refining disks juxtaposed with a refining gap therebetween for refining material within said refining gap, each of said pair of refining disks including a refining surface including a plurality of refining bars extending across said refining surface, said apparatus comprising a measuring surface comprising a predetermined portion of said surface of at least one of said refining disks and including at least a portion of a plurality of said refining bars, said measuring surface being resiliently mounted on said surface of said at least one of said refining disks, a pair of force sensors producing oppositely directed deflections when said measuring surface is influenced by said stress forces, and a body connecting said pair of force sensors to said measuring surface, whereby said stress forces can be calculated based on the difference between said deflections measured for said pair of force sensors.

4. The apparatus of claim 3 wherein said measuring surface includes a central axis substantially perpendicular to said measuring surface and wherein said pair of force sensors are symmetrically disposed with respect to said central axis.

5. The apparatus of claim 3 wherein each of said pair of force sensors abuts said body, and including attachment means for affixing said pair of force sensors with respect to said body.

6. The apparatus of claim 5 wherein said body includes an extending portion disposed distal from said measuring surface, said extending portion of said body including a joint whereby said body is pivotable about said joint in a direction substantially parallel to said surface of said at least one of said refining disks.

7. The apparatus of claim 3 including a seal member surrounding said measuring surface, said seal member comprising a yieldable material.

8. The apparatus of claim 7 wherein said body includes a first end connected to said measuring surface and a second opposite end, said apparatus further comprising a housing containing said pair of force sensors and said body, and attachment means for attaching said pair of force sensors to said housing, said second opposite end of said body affixed in said housing, and said measuring surface and said seal member sealing said housing.

9. The apparatus of claim 8 including a sleeve, with said sealing member being disposed in said sleeve, whereby said sealing member and said measuring surface closes said housing.

* * * * *